United States Patent [19]

Stinson

[11] Patent Number: 4,819,522

[45] Date of Patent: Apr. 11, 1989

[54] TORQUE-OFF COLLAR FOR INSTALLATION BY UNIVERSAL EQUIPMENT

[75] Inventor: Dennis D. Stinson, Whittier, Calif.

[73] Assignee: Hi-Shear Corporation, Torrance, Calif.

[21] Appl. No.: 95,354

[22] Filed: Sep. 10, 1987

[51] Int. Cl.4 .................................. B25B 13/00
[52] U.S. Cl. .................................. 81/113; 411/2
[58] Field of Search .................. 411/1, 2, 3, 6, 7; 81/113, 120

[56] References Cited

U.S. PATENT DOCUMENTS 4,518,295  5/1985  Matuschek .................. 411/3

Primary Examiner—Frederick R. Schmidt
Assistant Examiner—Maurina Rachuba
Attorney, Agent, or Firm—Donald D. Mon

[57] ABSTRACT

A torque-off collar having a circular driver section which can be gripped at any rotational angle by a torque tool, and a set of such collars of different size by having driver sections of equal size. A robot tool can randomly grasp such a collar, and can install any member of the set without making programatic provisions for collar size, or for angular alignment.

5 Claims, 1 Drawing Sheet

TORQUE-OFF COLLAR FOR INSTALLATION BY UNIVERSAL EQUIPMENT

FIELD OF THE INVENTION

This invention relates to torque-off collars for installation by universal equipment, for example by robotic installations.

BACKGROUND OF THE INVENTION

Torque-off collars are threaded nut-like devices which have a driver section engaged by a torque tool that shears off from a driver section when a predetermined torque is applied. the driver section of the collar then remains set on a pin to which it is engaged, set to the predetermined torque.

The classical torque-off collar is shown in U.S. Pat. No. 2,940,495, issued to George S. Wing. In this collar, the drive section is hexagonal so as to be engagable by a wrench or socket. It is customary for the size of the hexagonal section to differ from size to size of the collar, and this results in the need to change wrenches or sockets each time a different size of collar is set.

Also, the wrench and the collar must be properly aligned rotationally in order for the wrench to engage the flats on the drive section. This requires equipment or manipulation to bring them into alignment. Feed-in sockets are known for this purpose, and of course the operator can himself rotate the wrench or the collar to make the necessary alignment.

The above situations are acceptable for general assembly work, and the system is in widespread usage. Usually a large number of collars of the same size will be driven sequentially so that changing of sockets and the use of a lead-in socket are reasonable expedients. Also, if the alignment of the collar and wrench is not provided for by special devices, the minor nuisance or delay invovled is generally acceptable.

The same is not true for robotic installations. Such installations are programmed in exquisite detail, and any manipulation such as socket changes or alignment efforts from one collar size to another complicates the program and decreases the capacity of the system. In this sense, a robotic installation is an example of a universal installation, wherein a large range of sizes and head sizes can be set by a single tool system.

It is an object of this invention to provide a torque-off collar with a driver section of such dimensions that the samesized driver section can be used for other collar sizes also. It is another object to provide a driver section which does not require a special angular alignment between the driver and the drive section. A robotic driver can therefore randomly engage the drive section, and can drive a wide range of collar sizes without change of sockets or wrenches. Accordingly the collar of this invention is advantageously adapted for use in robotic systems.

BRIEF DESCRIPTION OF THE INVENTION

A torque-off collar according to this invention has a central axis, and an axial driven section with an integrally threaded passage therethrough. A driver section is integrally connected to the driven section, and has an exterior surface yet to be described. It is not internally threaded.

The driven section and the driver section are joined by a shear section which has a cross-section taken in a plane normal to the axis of the collar that has the least resistance to torque forces between the exterior section of the driver section and the free end of the driver section.

According to a feature of this invention, the exterior surface of the driver section is circular, preferably cylindrical, centered on the axis. The same diameter of exterior surface is used for a plurality of collar sizes, so that a single driver which is adapted to grip a circular surface can be used to set a plurality of different collar sizes without additional provisions for changing the grip size. By virtue of the circularity, there is no need for special alignment of the collar and the tool.

This invention contemplates the collar, the plurality of different collar sizes with the same sized driver section, and the combination of these with a tool adapted to a drive a circular exterior surface.

The above and other features of this invention will be fully understood from the following detailed description and the accompanying drawings, in which:

DETAILED DESCRIPTION OF THE INVENTION

Figure 1:
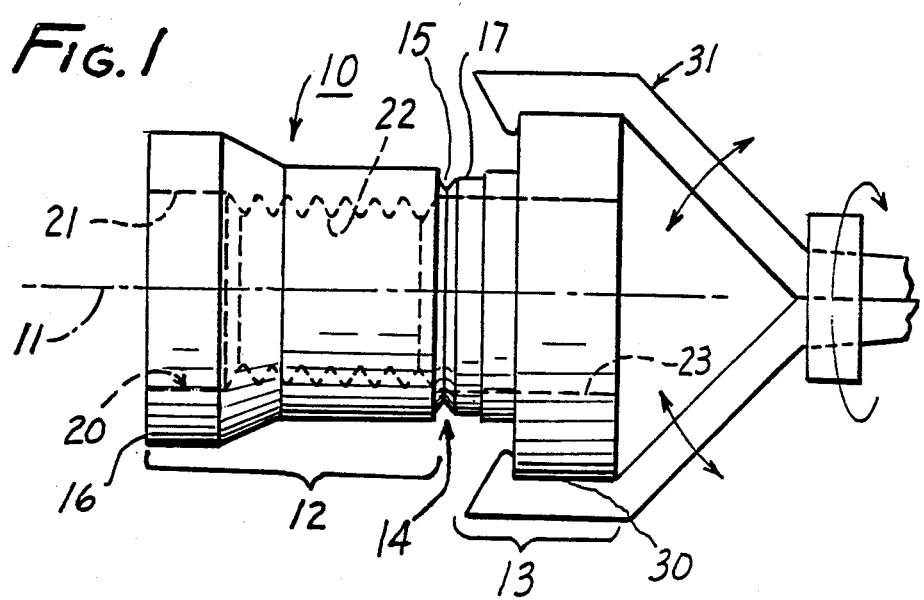
FIG. 1 is a side view of a collar according to the invention, including a suitable driving tool.
Figure 2:
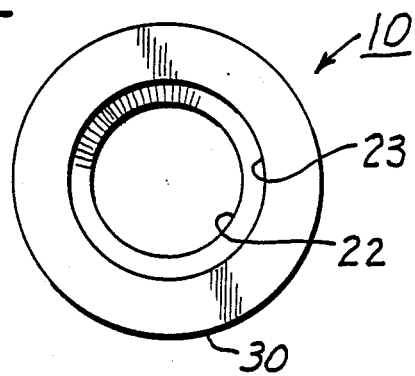
FIG.2 is a right hand end view of the collar in FIG. 1.

FIG. 1 shows a classical torque-off collar 10, of the type sold by Hi-Shear Corporation of Torrance, California under its registered trademark "Hi-Lok". It is constructed in general accordance with the details and criteria described in Wing U.S. Pat. No. 2,940,495, which is incorporated herein in its entirety for its showing of such a fastener.

Collar 10 has a central axis 11, a driven section 12, and a driver section 13. A shear section 14 joins the driven section and the driver section. It includes a peripheral groove 15 that reduces the cross-section of the collar in the plane normal to the central axis. This reduced cross-section has the least resistance to torque forces between the driver section and the free end 16 of the driven section. The driver section may conveniently include a tubular portion 17 that isolates the shear section from distortive forces exerted on the driver section.

The driven section is usually pressed out of round adjacent to the shear section to provide a prevailing thread lock. The tubular portion isolates the free end portion of the driven section from distortion that might be caused by pressing the driven section out of round.

A passage 20 extends from end to end of the collar. At the free end of the collar there is a counterbore 21 to receive incomplete threads of a pin to which the collar is threaded. An internal thread 22 extends from the counterbore nearly to the shear section. An enlarged smooth bore 23 extends through the driver section as a continuation of the passage. When the collar is set on a pin and torqued to a predetermined torque the shear section will fracture and the driver section will come loose, leaving the collar set on the pin to a desired torque established by the shearing off of the driver section. This torque is determined by the shear strength of the shear section. If the driven section when set no longer has the driver section on it, the absence of the driver section becomes assurance that a correct torque has been applied.

For engagement by a torque tool, the driver section is provided with an exterior surface 30 that is centered on the central axis. Preferably it is cylindrical and has a diameter. Then a torque tool such as a collet grip 31 (schematically shown in FIG. 1) or a cam lock wrench can be applied to it at any rotational portion around it. No attention need be given to rotational alignment of the tool and the driver section. It is only necessary that the driver be able to grip a circular surface, and be adapted to exert a torque while it does grip the surface. This enables a robot-held torque tool to be applied directly to the collar, and eliminates the need for the robot program to provide for angular adjustments.

In many practical applications, collars of various sizes should be sequentially driven. By size is meant the nominal thread diameter of the thread in the passage, and of the pin to which it is threaded. For example, 5/32, 3/16 and ¼ inch sizes are frequently used in the same installation. In conventional collars, each of these sizes has a different spacing between the driving faces, that is to say a different sized hex head. With this invention, the same diameter of exterior surface can be used for these three sizes, for example about 0.437 inches. Then the robot program need not be adjusted to adapt to each size of driver surfaces, and the program is remarkably simplified.

An another example, nominal sizes of 5/16 and ¾ inches can both utilize an exterior surface diameter of 0.650 inches.

This invention thereby provides the benefits of a torque-off collar, while permitting the use of various collar sizes without changing the tool, and freeing the program from the need rotationally to align the tool and the collar. The favorable economic consequences of simplifying the robotic program and increasing the throughput capacity of the tooling system are substantial.

This invention is not to be limited by the embodiments shown in the drawings and described in the description, which are given by way of example and not of limitation, but only in accordance with the scope of the appended claims.

I claim:

1. In a torque-off collar of the type which comprises: a unitary body having a central axis, a driven section, a driver section, and a shear section interconnecting said driven section and said driver section, an axial passage extending from end to end through said body, a first counterbore in the passage adjacent the free end of the driven section, an internally threaded portion in said driven section, and an unthreaded second counterbore at the free end of the driver section, in that order, said shear section constituting the region of least resistance to torque between the driver section and the free end of the driven section, the second counterbore extending through said driver section and through said shear section, the improvement comprising: a circular exterior surface on said driver section centered on said axis adapted to be gripped by a torque tool at any rotational angle around said axis, said exterior surface having a diameter.

2. A set of collars according to claim 1 having different internal thread diameters, and equal diameters on the respective said exterior surfaces.

3. A collar according to claim 1 in which said exterior surface is a cylinder.

4. In combination: a collar according to claim 1, and a torque tool adapted to grip said exterior surface and to exert torque on said driver section at said exterior surface.

5. In combination: a set of collars according to claim 2, and a torque tool adapted to grip said exterior surface and to exert torque on said driver section at said exterior surface.

* * * * *